[19] United States Patent
Anglin

[11] Patent Number: 4,889,311
[45] Date of Patent: Dec. 26, 1989

[54] MOLDING APPARATUS WITH IMPROVED EJECTOR PIN
[75] Inventor: Willie R. Anglin, Burnsville, N.C.
[73] Assignee: Outboard Marine Corporation, Waukegan, Ill.
[21] Appl. No.: 230,793
[22] Filed: Aug. 10, 1988
[51] Int. Cl.[4] .................. B22D 17/22; B29C 45/40
[52] U.S. Cl. ........................... 249/68; 164/347; 249/134; 425/444; 425/556
[58] Field of Search .............. 164/347; 249/67, 68, 249/134; 425/537, 556, 350, 351, 422, 444

[56] References Cited
U.S. PATENT DOCUMENTS

| | | | | |
|---|---|---|---|---|
| 2,837,796 | 6/1958 | Aliberti | ................................ | 249/68 |
| 3,384,335 | 5/1968 | Schwarz | ................................ | 249/67 |
| 3,914,086 | 10/1975 | Hujik | ................................ | 249/68 X |
| 4,661,055 | 4/1987 | Thivichon-Prince et al. | ...... | 425/444 X |

Primary Examiner—Kurt Rowan
Assistant Examiner—J. Reed Batten, Jr.
Attorney, Agent, or Firm—Michael, Best & Friedrich

[57] ABSTRACT

A molding aperture comprising a mold piece having therein an aperture and including a surface at least partially defining a mold cavity, the mold piece being made of a first material, an ejector pin slideably housed in the aperture and made of second material substantially softer than the first material, and a mechanism for moving the ejector pin relative to the mold piece so that the ejector pin separates a molded part from the mold piece surface.

13 Claims, 1 Drawing Sheet

MOLDING APPARATUS WITH IMPROVED EJECTOR PIN

BACKGROUND OF THE INVENTION

The invention relates to die casting or injection molding apparatus, and, more particularly, to apparatus for molding foam patterns for use in a lost foam casting process.

A conventional injection molding or die casting apparatus includes a mold piece or die member having therein an aperture and including a surface at least partially defining a mold cavity. The apparatus also includes an ejector pin which has an outer end surface and which is slideably housed in the aperture. The ejector pin is movable between a first or retracted position wherein the outer end surface of the pin is flush with the surface of the mold piece, and a second or extended position wherein the outer end surface of the pin is located outwardly of the mold piece surface so that the ejector pin separates a molded part from the mold piece surface. The mold piece is typically made of an aluminum alloy, and the ejector pin is typically made of a metal that is dissimilar to aluminum, such as stainless steel, chrome-plated steel, brass or copper.

A disadvantage of such an apparatus is undesirable wear on both the ejector pin and the mold piece due to relative movement of the two parts. The pin cannot be lubricated because, at least in the case of apparatus for injection molding foam parts, the apparatus operates in a steamy environment that would remove a lubricant. Also, a lubricant could contaminate a foam part being molded by the apparatus. Furthermore, the breaking of an ejector pin can cause significant damage to the mold piece, and the ejector pin can cause significant damage to the opposite mold piece during a "mold crash," i.e., during accidental closing of the mold pieces with the ejector pin extended.

SUMMARY OF THE INVENTION

The invention provides a molding apparatus comprising a mold piece having therein an aperture and including a surface at least partially defining a mold cavity, the mold piece being made of a first material, an ejector pin slideably housed in the aperture and made of second material substantially softer than the first material, and means for moving the ejector pin relative to the mold piece so that the ejector pin separates a molded part from the mold piece surface.

The invention also provides a molding apparatus comprising a mold piece including a surface at least partially defining a mold cavity, the mold piece being made of a first material, and means including an ejector pin for separating a molded part from the mold piece surface, the ejector pin being made of second material substantially softer than the first material.

A principal feature of the invention is the provision of a molding apparatus comprising a plastic ejector pin. This reduces wear on the ejector pin and on the mold piece and reduces damage to the mold piece due to breaking of the ejector pin. This also reduces damage to the opposite mold piece during a "mold crash" because the pin will deform instead of damaging the opposite mold piece.

Other features and advantages of the invention will become apparent to those skilled in the art upon review of the following detailed description, claims and drawings.

Figure 1:
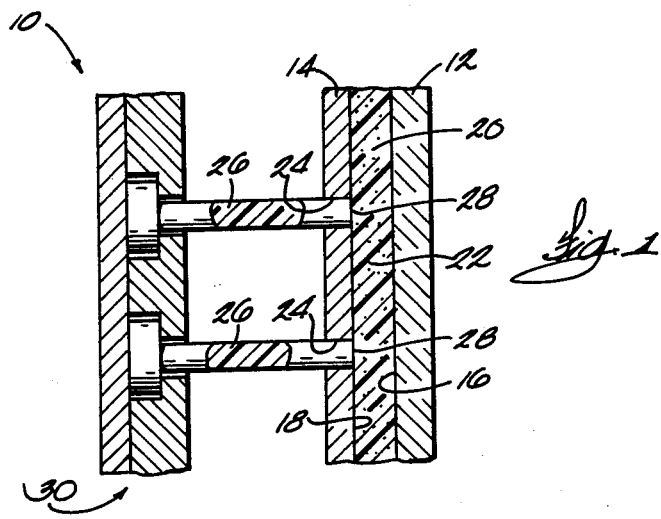
FIG. 1 is a side elevational view, partially in section, of a molding apparatus embodying the invention and including a mold piece and a pair of ejector pins.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A die casting or injection molding apparatus 10 embodying the invention is illustrated in the drawings. Preferably, the apparatus 10 is used for injection molding foam patterns for use in a lost foam casting process. The apparatus 10 includes first and second relatively movable mold pieces 12 and 14, respectively. In the preferred embodiment, the first mold piece 12 is stationary and the second mold piece 14 is movable. It should be understood, however, that both parts 12 and 14 could be movable, or the second part 14 could be stationary and the first part 12 movable.

The mold pieces 12 and 14 are preferably made of a metal, and more particularly of an aluminum alloy. The mold pieces 12 and 14 include surfaces 16 and 18, respectively, each of which partially defines a mold cavity 20. The mold cavity 20 is adapted to be filled with a suitable material, such as foam beads, for forming a molded part 22 such as the above-described foam pattern. The second mold piece 14 has therein a pair of apertures 24.

The apparatus 10 also comprises means including ejector pins 26 for separating the molded part 22 from the mold piece surface 18. In the preferred embodiment, each of the ejector pins 26 is slideably housed in a respective aperture 24 and each has an outer end surface 28. The ejector pins 26 are made of a material that is substantially softer than the mold pieces 12 and 14, that has natural lubricity and that is wear-resistant. Preferably, the ejector pins 26 are made of plastic. Examples of suitable plastics are nylon, reinforced nylon and polysulfones.

The apparatus 10 also comprises means for moving the ejector pins 26 relative to the mold piece 14 between a first or retracted position (FIGS. 1 and 2) wherein the outer end surfaces 28 of the pins 26 are flush with the surface 18 of the mold piece 14, and a second or extended position (FIG. 3) wherein the outer end surfaces 28 of the pins 26 are located outwardly of the mold piece surface 18 so that the molded part 22 is separated from the surface 18. While various suitable moving means can be employed, in the preferred embodiment, such means includes an ejection plate assembly 30 fixedly connected to the left ends (as shown in the drawings) of the pins 26. The plate assembly 30 is movable relative to the mold piece 14 between a first position (shown in FIGS. 1 and 2) wherein the pins 26 are in the retracted position, and a second position (shown in FIG. 3) wherein the pins 26 are in the extended position. Any suitable means (not shown) can be used for moving the plate assembly 30 relative to the mold piece 14.

Figure 2:
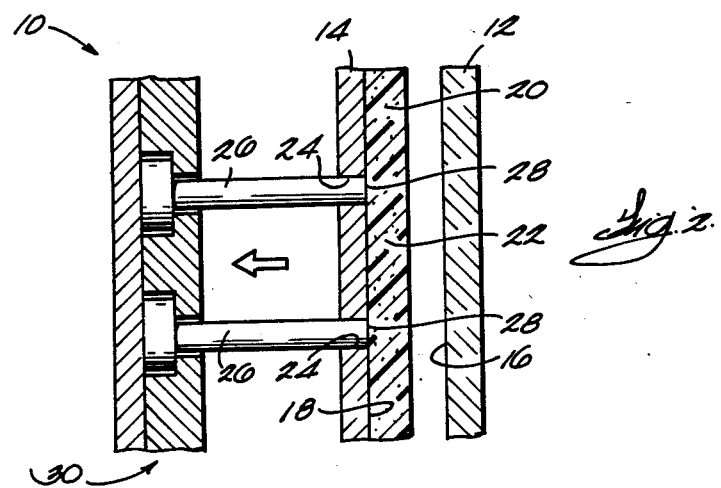
FIG. 2 is a view similar to FIG. 1 and showing the mold piece in a second position.
Figure 3:
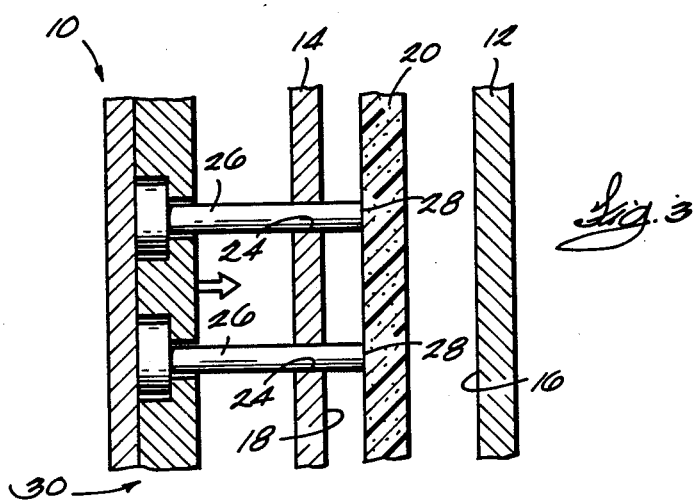
FIG. 3 is a view similar to FIG. 2 and showing the ejector pins in a second position relative to the mold piece.

The apparatus 10 operates as follows. With the mold pieces 12 and 14 mating to define the mold cavity 20 and with the pins 26 in the retracted position, as shown in FIG. 1, foam is injected into the cavity 20 to form the molded part 22. The mold piece 14 and the plate assembly 30 are then moved away from the mold piece 12, as shown in FIG. 2. Suitable means which are known in the art can be provided for causing the molded part 22 to move with the mold piece 14. Finally, as shown in FIG. 3, the plate assembly 30 is moved to the right relative to the mold piece 14 in order to move the ejector pins 26 to the right relative to the mold piece 14 and to thereby eject the molded part 22 from the mold piece 14.

Various features of the invention are set forth in the following claims.

I claim:

1. A molding apparatus comprising a mold piece having therein an aperture and including a surface at least partially defining a mold cavity, said mold piece being made of a first material, an ejector pin slideably housed in said aperture and made of second material substantially softer than said first material, and means for moving said ejector pin relative to said mold piece so that said ejector pin separates a molded part from said mold piece surface.

2. An apparatus as set forth in claim 1 wherein said mold piece is made of metal.

3. An apparatus as set forth in claim 1 wherein said mold piece is made of an aluminum alloy.

4. An apparatus as set forth in claim 1 wherein said ejector pin is made of plastic.

5. An apparatus as set forth in claim 1 wherein said ejector pin is made of a material having natural lubricity.

6. An apparatus as set forth in claim 1 wherein said ejector pin is made of a wear-resistant material.

7. A molding apparatus comprising a mold piece including a surface at least partially defining a mold cavity, said mold piece being made of a first material, and means including an ejector pin for separating a molded part from said mold piece surface, said ejector pin being made of second material substantially softer than said first material.

8. An apparatus as set forth in claim 7 wherein said mold piece is made of metal.

9. An apparatus as set forth in claim 7 wherein said mold piece is made of an aluminum alloy.

10. An apparatus as set forth in claim 7 wherein said ejector pin is made of plastic.

11. An apparatus as set forth in claim 7 wherein said ejector pin is made of a material having natural lubricity.

12. An apparatus as set forth in claim 7 wherein said ejector pin is made of a wear-resistant material.

13. A molding apparatus comprising a mold piece having therein an aperture and including a surface at least partially defining a mold cavity, said mold piece being made of an aluminum alloy, an ejector pin slideably housed in said aperture and made of a plastic which is substantially softer than said alloy, which has natural lubricity and which is wear-resistant, and means for moving said ejector pin relative to said mold piece so that said ejector pin separates a molded part from said mold piece surface.

* * * * *